(12) United States Patent
Martinez

(10) Patent No.: US 9,638,111 B2
(45) Date of Patent: May 2, 2017

(54) PROVIDING OXIDATION TO A GAS TURBINE ENGINE

(76) Inventor: Anthony R. Martinez, Westminster, MD (US)

( * ) Notice: Subject to any disclaimer, the term of this patent is extended or adjusted under 35 U.S.C. 154(b) by 523 days.

(21) Appl. No.: 14/344,555

(22) PCT Filed: Sep. 14, 2012

(86) PCT No.: PCT/US2012/055359
§ 371 (c)(1),
(2), (4) Date: Mar. 12, 2014

(87) PCT Pub. No.: WO2013/040323
PCT Pub. Date: Mar. 21, 2013

(65) Prior Publication Data

US 2014/0338305 A1 Nov. 20, 2014

Related U.S. Application Data

(60) Provisional application No. 61/586,976, filed on Jan. 16, 2012, provisional application No. 61/534,843, filed on Sep. 14, 2011.

(51) Int. Cl.
*F02D 21/10* (2006.01)
*F02C 3/14* (2006.01)
(Continued)

(52) U.S. Cl.
CPC ............... *F02D 21/10* (2013.01); *F02C 3/14* (2013.01); *F02C 3/22* (2013.01); *F02C 3/24* (2013.01); *F02C 9/266* (2013.01)

(58) Field of Classification Search
CPC .. F02D 21/10; F02C 9/266; F02C 3/22; F02C 3/24; F02C 3/14
(Continued)

(56) References Cited

U.S. PATENT DOCUMENTS 3,577,878 A * 5/1971 Greenwood .............. F23R 3/26
60/39.23
5,025,623 A 6/1991 Hirakoso et al.
(Continued)

FOREIGN PATENT DOCUMENTS

AU    WO 2000-66045 A1   11/2000
CA    2370423 A1         11/2000
(Continued)

*Primary Examiner* — Steven A. Reynolds
(74) *Attorney, Agent, or Firm* — Advent, LLP; Erik M. Antonson; Gerald M. Keller

(57) ABSTRACT

A gas turbine engine includes a compressor for compressing air from an environment; a combustor for receiving the compressed air from the compressor, mixing the compressed air with fuel, and combusting the fuel; a turbine coupled with the compressor for receiving exhaust gas from the combustion and powering the compressor; and an injector coupled with a source of oxidizer for injecting the oxidizer into the combustor. A method for operating a gas turbine engine includes compressing air from an environment; receiving the compressed air at a combustor; mixing the compressed air with fuel; injecting oxidizer into the combustor in addition to the air from the environment; combusting the fuel with the compressed air and the oxidizer; receiving exhaust gas from the combusted fuel; and powering the compression of the air from the environment using the exhaust gas.

18 Claims, 11 Drawing Sheets

(51) Int. Cl.
*F02C 3/22* (2006.01)
*F02C 3/24* (2006.01)
*F02C 9/26* (2006.01)

(58) Field of Classification Search
USPC .................................................. 60/39.23, 776
See application file for complete search history.

(56) References Cited

U.S. PATENT DOCUMENTS

| | | |
|---|---|---|
| 5,119,626 A | 6/1992 | Lardellier et al. |
| H1234 H | 10/1993 | Burgner |
| 5,398,495 A * | 3/1995 | Ciccia ....................... F23R 3/26 60/39.23 |
| 6,119,983 A | 9/2000 | Provitola |
| 6,148,609 A | 11/2000 | Provitola |
| 6,460,344 B1 | 10/2002 | Steinthorsson et al. |
| 6,560,964 B2 | 5/2003 | Steinthorsson et al. |
| 6,619,031 B1 | 9/2003 | Balepin |
| 6,644,015 B2 | 11/2003 | McKinney |
| 6,758,044 B2 | 7/2004 | Mannarino |
| 6,883,332 B2 | 4/2005 | Steinthorsson et al. |
| 6,941,760 B1 | 9/2005 | Jones |
| 6,973,774 B1 | 12/2005 | Wood |
| 6,993,916 B2 | 2/2006 | Johnson et al. |
| 7,305,816 B2 | 12/2007 | Freese et al. |
| 7,424,805 B2 | 9/2008 | Johnson |
| 2003/0051478 A1 * | 3/2003 | Matsuyama ............ F23R 3/286 60/725 |
| 2005/0039456 A1 | 2/2005 | Hayashi |
| 2006/0242943 A1 | 11/2006 | Johnson |
| 2011/0011092 A1 | 1/2011 | Yoshida et al. |
| 2011/0094239 A1 | 4/2011 | Koizumi et al. |
| 2011/0185736 A1 | 8/2011 | McKinney |

FOREIGN PATENT DOCUMENTS

| | | |
|---|---|---|
| CA | 2748737 | 7/2010 |
| EP | 0403372 A1 | 6/1990 |
| EP | 0403372 B1 | 6/1990 |
| EP | 1175332 A4 | 11/2000 |
| EP | 1175332 A2 | 1/2002 |
| GB | 2425574 A | 11/2006 |
| GB | 2425574 B | 6/2010 |
| JP | 63-124833 A | 5/1988 |
| JP | 3067026 A | 3/1991 |
| JP | 6006904 B2 | 1/1994 |
| WO | WO-00-66425 A2 | 11/2000 |
| WO | WO-00-66425 A3 | 11/2000 |
| WO | WO-2010/101426 | 10/2010 |

* cited by examiner

PROVIDING OXIDATION TO A GAS TURBINE ENGINE

BACKGROUND

A gas turbine is a type of internal combustion engine that has a rotating compressor coupled to a downstream turbine, with a combustion chamber located between the compressor and the turbine. Gas turbines are sometimes referred to as combustion turbines. Fuel is mixed with air in the combustor, and the mixture of fuel and air is ignited. Combustion products are forced into the turbine, where gas flow is directed over turbine blades to spin the turbine and power the compressor. In some instances the gas turbine can be used to drive a mechanical output.

SUMMARY

Techniques and systems are described for operating a gas turbine. For example, a gas turbine engine includes a compressor for compressing air from an environment; a combustor for receiving the compressed air from the compressor, mixing the compressed air with fuel, and combusting the fuel; a turbine coupled with the compressor for receiving exhaust gas from the combustion and powering the compressor; and an injector coupled with a source of oxidizer for injecting the oxidizer into the combustor. A method for operating a gas turbine engine includes compressing air from an environment; receiving the compressed air at a combustor; mixing the compressed air with fuel; injecting oxidizer into the combustor in addition to the air from the environment; combusting the fuel with the compressed air and the oxidizer; receiving exhaust gas from the combusted fuel; and powering the compression of the air from the environment using the exhaust gas.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
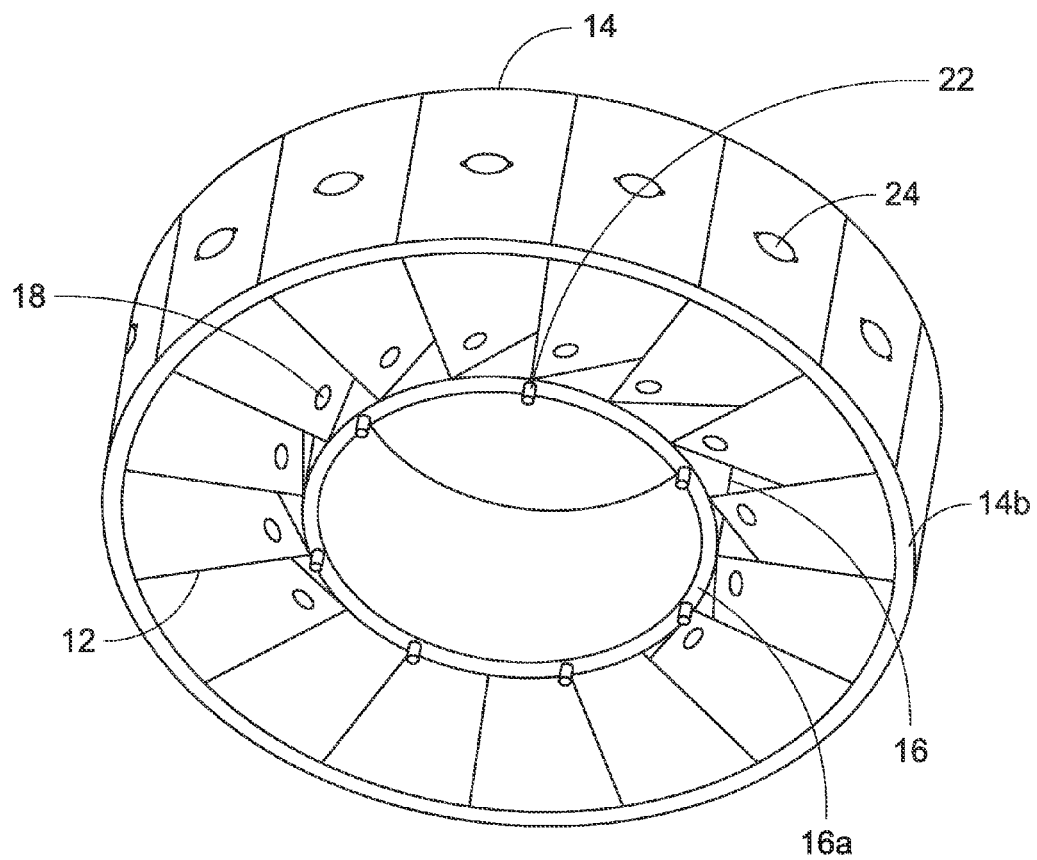
FIG. 1 is a partial perspective view illustrating a jet engine oxidation system in accordance with example implementations of the present disclosure.

The need for more efficient energy production technologies to power aircraft continues to rise. It has been the driving force that prompts researchers and developers to improve upon aircraft efficiency within various aspects of technical design. As global travel markets continue to grow, the demand for more advanced technologies within aircraft will continue its escalation.

Combustion technologies remain one of the most power dense sources of energy. Alternative energy sources may be applicable in some regard; however, combustion is necessary to keep up with the energy demands that power commercial and military aircraft. Understandably, this combustion technology is irreplaceable within many areas of application.

Increasing focus on developing methods to produce power with lower emissions and improved efficiency has been a leading driving force in studying the dynamics of lean premixed combustion techniques.

Other techniques relating to enhancing the oxidation to a gas turbine engine may have certain advantages in the areas of high altitude flight, trans-atmospheric travel, and high thrust performance characteristics. These techniques may also carry disadvantages, which may reside in the areas of rapid fuel consumption and high exhaust temperatures. For example, high exhaust gas temperatures are undisputed contributors of nitrogen oxides. Thus, these techniques are not currently applicable for commercial air travel.

Accordingly, systems, methods, and apparatus are described for enhancing oxidation to a gas turbine engine; operating an oxidation system of a gas turbine engine (e.g., a turbofan engine) at lower exhaust temperatures; and improving fuel burn within the combustion process. The present disclosure provides relevant applications as to how the techniques disclosed herein may be used in the aerospace industry. However, the aerospace industry is provided by way of example only and is not meant to be restrictive of the present disclosure. Thus, techniques in accordance with the present disclosure may also be used with gas turbine engines in other various applications including, but not necessarily limited to: turboshaft engines, turboprop engines, ground industrial electrical generation, ships (e.g., naval vessels), vehicles (e.g., tanks), and so forth.

The systems, methods, and apparatus disclosed herein may benefit every type of aircraft using turbomachinery including, but not necessarily limited to: commercial airliners and military aircraft, and generally weight classes including, but not necessarily limited to: Medium, Heavy, and very Heavy. Further, techniques in accordance with the present disclosure can be used with various engines including, but not necessarily limited to: air-breathing jet engines, ramjet engines, scramjet engines, engines that use reheat techniques (e.g. afterburners), and so forth.

Because thermal efficiency is improved via the described oxidation system, less fuel may be required to be stored onboard an aircraft. Further, when the same amount of fuel is stored onboard the aircraft, the flight range of the aircraft may be increased. Because the aircraft is burning less fuel at an improved efficiency, for a shorter route an aircraft can be loaded fuel light and maintain the advantage of being lighter than normal. For longer routes, an aircraft can be loaded more fuel heavy with no weight advantage but with a longer-range advantage.

The systems, methods, and apparatus disclosed herein may provide an enriched oxidation system beneficial to the fuel efficiency of a gas turbine engine. By operating at lower exhaust temperatures, techniques of the present disclosure may hold the emissions of nitrogen oxides within regulatory standards. Further, the oxidation system may improve efficiency within an aircraft engine via improved oxidation quality to the engine, added pressure from the injectors (e.g., oxidizing injectors), and/or additional pressure, as described in more detail below.

The present disclosure provides a gas turbine engine with improved fuel burn using enhanced oxidation with an onboard oxidizer. Arrangements are provided for injecting an oxidizer into the combustor section. The injectors within a swirler spray the oxidizer into the air/fuel mixture using a swirling motion. This configuration may augment the standard technique of compressing outside air through the compressor section(s) of a jet engine. Improved oxidation quality may result in a more complete combustion course and higher exhaust gas temperatures. Less fuel may be burned while obtaining lower exhaust inlet temperatures for normal engine operations. In a specific implementation, the vanes of the swirler can rotate up to twenty degrees) (20°, increasing and/or decreasing the angle of slant, and enabling a higher-pressure flow into the combustor. However, twenty degrees (20°) is provided by way of example only, and is not meant to be restrictive of the present disclosure.

Example Implementations

In gas turbine engines, thrust growth may be dependent on increased high pressure turbine rotor inlet temperature and/or increased core mass flow. Both are dependent on increased combustor fuel flow. Thus, heat energy needed to drive both the high pressure and low pressure turbines may be dictated by combustor fuel flow. This makes a conventional technique of thrust growth a single-adjusted system.

In high-bypass turbofan engines, the large fan airflow requires increased power from the core, e.g., to compensate for the large volume of airflow moved. This can be achieved by increasing the overall pressure ratio. Increasing turbine inlet temperature induces more air pressure into the core. These parameters can increase core thermal efficiency and improve overall fuel efficiency. The present disclosure reflects the general principles of improving thermal efficiency in order to achieve optimal fuel usage.

Figure 2:
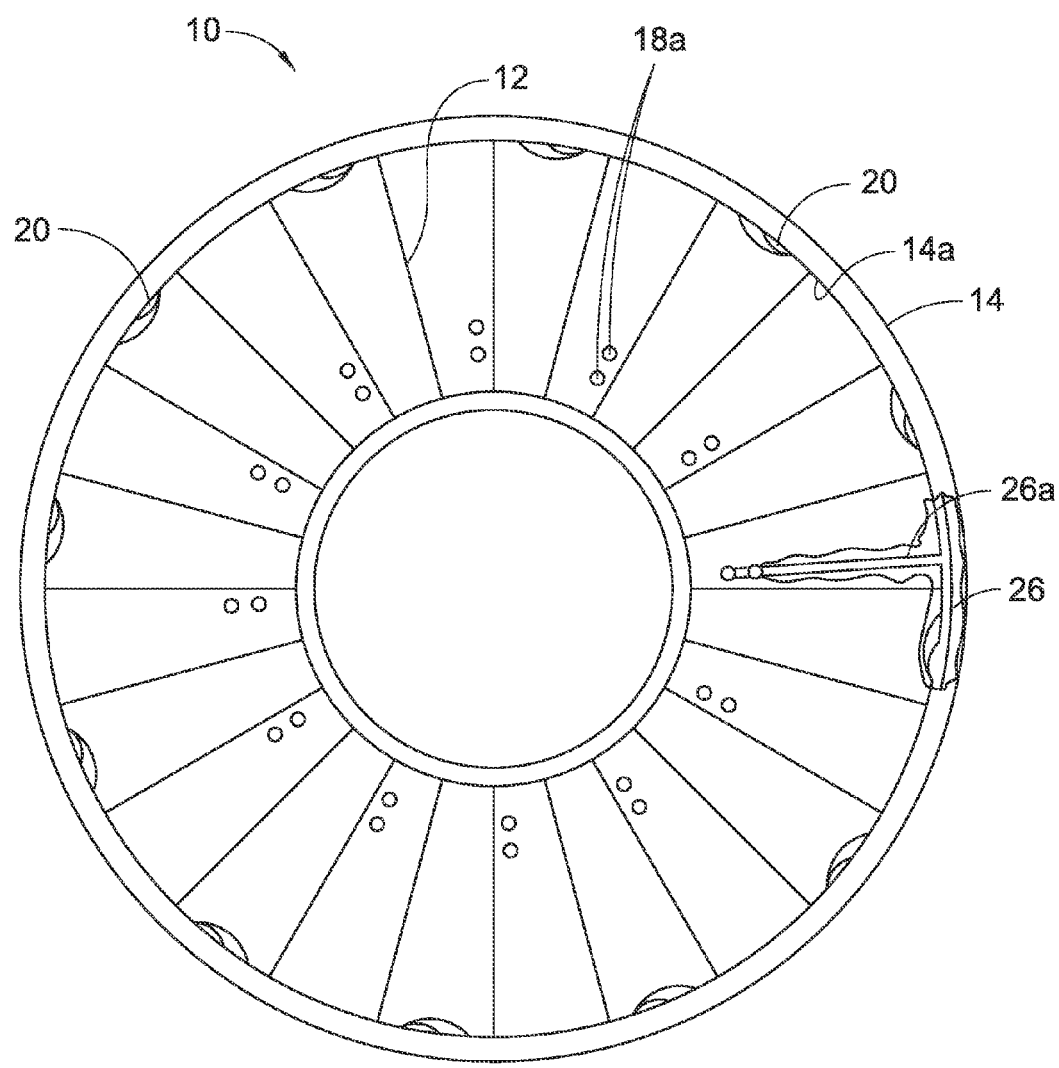
FIG. 2 is a perspective view illustrating a swirler for a jet engine oxidation system in accordance with example implementations of the present disclosure.

Pressurized oxygen may be injected into the air/fuel mixture within a combustor. In one or more implementations, the combustor may be an annular combustor. However, an annular combustor is provided by way of example only and is not meant to be restrictive of the present disclosure. Thus, other types of combustors may be utilized with the oxidation system described herein. Injectors may be used to spray oxygen into the air/fuel mixture with a swirling motion. In implementations, the swirling motion can be achieved by oxidizer being released through the injectors/pores (e.g., as shown in FIG. 2) in generally the same directional angle of the tilted swirler vanes. The added oxidizer flows in the same directional pattern of incoming air into the combustor, and the swirling motion is caused by the swirler. The location of the injectors/pores supports even disbursement of oxidizer into the mixture of air/fuel. In order to achieve optimal performance efficiencies, the ratio of oxygen to fuel may be increased. This may further the leaning process and result in increasing inlet temperatures with minor or no increases to combustor fuel flow. This may be attributed to a more complete combustion course within the combustor.

The rise in rotor inlet temperature may also be attributed to an increase in pressure directed from the injectors within the swirler, which deliver additional oxygen into the combustor. The injectors may add to the current core mass flow within the combustor, and ultimately improve the overall pressure ratio to the core.

Figure 4:
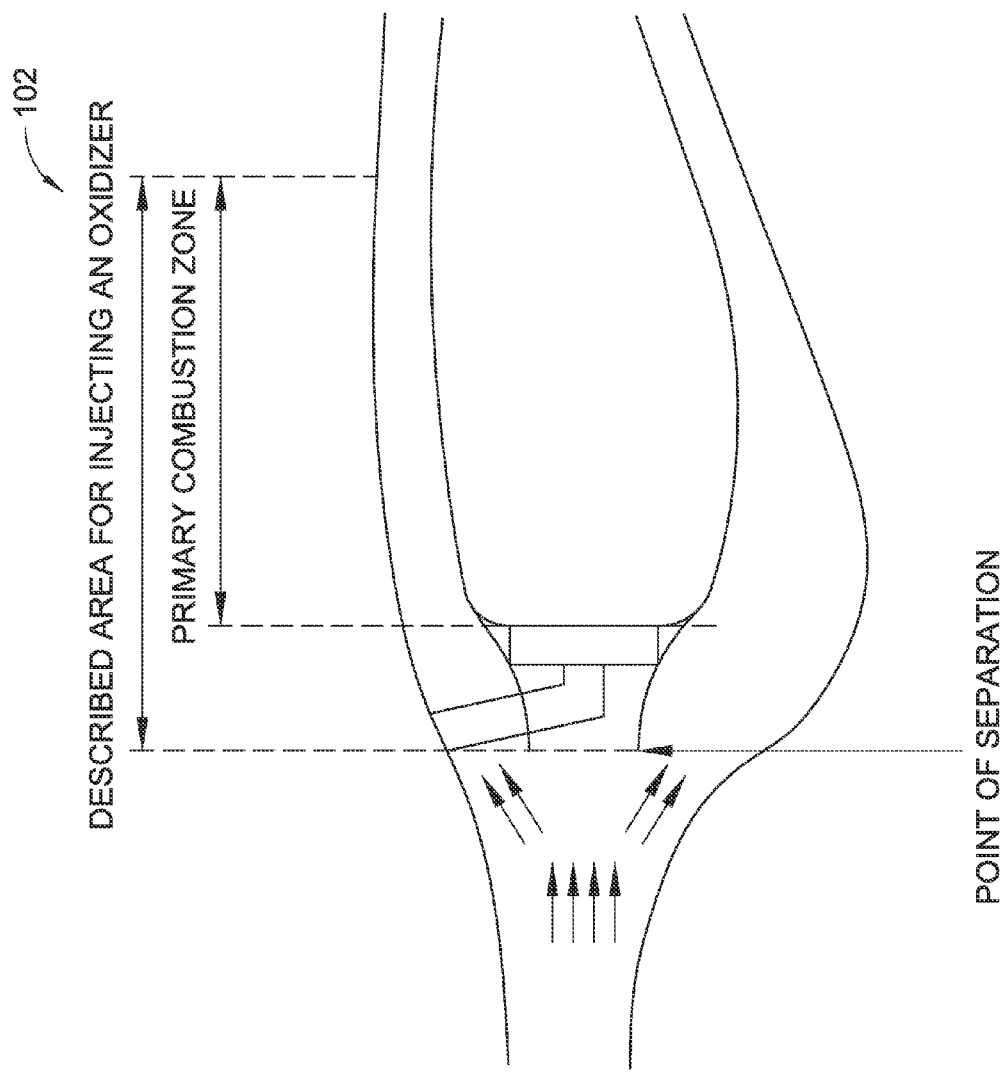
FIG. 4 is a partial cross-sectional side elevation view of the jet engine illustrated in FIG. 3, further illustrating a combustor in accordance with example implementations of the present disclosure.

However, it should be noted that the location at which the oxidizer is released and/or injected is not limited to the swirler. Thus, the oxidizer may be released/injected in-between a location where the primary air enters the core of the combustor and the primary combustion zone, including cooling holes and/or dilution holes surrounding the combustor. For example, with reference to FIG. 4, the point of separation may be defined as a location where primary air first enters the core; this is the point at which the air is separated. In implementations, one part of the air enters the core, which leads to the combustion chamber, and the other part is separated, which bypasses and cools the outer part of the combustion chamber. Releasing/injecting the oxidizer in the area shown in FIG. 4 may furnish the majority of the oxidizer for use in combustion. For example, if the oxidizer is released/injected outside of the area shown, a larger portion of the oxidizer may bypass the outer part of the combustion chamber, or may not contribute to effective combustion (e.g., since combustion may occur quickly in a forward part of the combustor). This may result in a decrease in usable oxidation flight time.

When the oxygen ratio in the fuel mixture is increased, rotor inlet temperature may be increased as a result of the combustion process. Therefore, Low Pressure (LP) and High Pressure (HP) compressors may improve the overall airflow of outside air and air pressure into the combustor. This may result in improved oxidation and pressure from outside air. A reduction in fuel may be obtained, along with suitable exhaust inlet temperatures for normal engine operations. This type of configuration may be referred to as a "Dual-Adjusted Inlet Temperature System."

The enhanced oxidation system may be engaged at engine power operating levels of low thrust output, mid thrust output, and/or medium high thrust output. When the oxidation system is employed, it may improve these thrust settings as a result from the combustion process within the combustor. When the oxidizer is delivered through the injectors, there may be an oxidation content increase and/or a pressure ratio increase. Both can affect the exhaust inlet temperatures, and may be responsible for raising it.

In some instances, excessive inlet temperatures may occur if the system is engaged while the engine is at full operating power, e.g., when power settings are above approximately ninety percent (90%) to one hundred percent (100%) in standard conditions. In some instances, the system may be most effective when employed at throttle lever positions of approximately fifty percent (50%) to ninety percent (90%) of full engine power settings. Increasing turbine inlet temperatures may improve the overall pressure ratio to the core. This, in turn, may increase the core thermal efficiency. Therefore, efficiency performances in some configurations may be highest closest to the eighty-five percent (85%) to ninety percent (90%) throttle lever positions of the engine when the oxidation system is engaged. In other instances, the oxidation system may be engaged between fifty percent (50%) and one hundred percent (100%) of full engine power settings. In a particular example, the power settings of a turbofan engine are set to ninety-nine percent (99%) full power in standard conditions. The oxidation system is then engaged to improve the engine power by an additional fifteen percent (15%) in standard conditions. The certified maximum redline exhaust temperature of the engine is then exceeded. As a result, the oxidation system is employed for use out of engine limitations. In this manner, various percentages of oxidation may be introduced with various combinations of engine power settings, and may be suitable for operational engine temperatures at or below a certified maximum temperature of an engine.

In a particular example, a turbofan engine at full power may have a certified maximum redline exhaust temperature of approximately nine hundred thirty degrees Celsius (930° C.) at takeoff. When preparing for takeoff configuration, throttle lever position may be advanced from idle to below eighty-five percent (85%) full position. After the oxidation system is engaged, the actual engine power may increase to above eighty-five percent (85%) full power. When employing the system to improve static thrust to eighty-five percent (85%), the turbine inlet temperature may be approximately sixty-five degrees Celsius (65° C.) lower at takeoff in some instances, as opposed to full power without the system employed. This technique may hold relevance to aircraft operators (e.g., carriers) with interest in operating at lower engine temperatures, while maintaining an effective takeoff static thrust configuration.

With new regulations, operating turbine engines at lower exhaust temperatures can be a key factor in controlling the emissions of an aircraft. The techniques of employing the oxidation system at lower than full potential engine power may be an important practice for reducing those emissions, as higher exhaust inlet temperatures are responsible for producing more oxides of nitrogen. Of the five major types of emissions, nitrogen oxides are generally considered to be a more damaging greenhouse gas.

For specific flight conditions, it may be necessary to employ the system below approximately eighty percent (80%) of the engine power settings. This technique may be a practical way to keep inlet temperatures lower at takeoff. This practice may be applicable in specific regions that hold higher emissions standards.

An example of inefficient use of the oxidation system would be to engage it at an engine power setting during ground operations, especially while taxiing the aircraft. The total usable oxidation time may be limited; therefore using it during the preliminary stages of flight may not be as effective.

For specific takeoff conditions when the oxidation system is engaged, the oxidation system may be increased to reach the near maximum certified temperature of an engine. However, in some instances, the certified redline temperature of that engine may not be exceeded. Operating at or beyond the maximum certified temperature of the engine may decrease the overall lifespan of its parts, and may increase the frequency of necessary inspections. In implementations, an engine is not operated beyond its full thrust output capabilities, but rather the midrange/mid-high range power output of an engine is supplemented by improving thermal efficiency with an oxidation system as described herein.

It should be noted that the present disclosure contemplates full integration into control systems, such as advanced computer controlling systems including, but not necessarily limited to: a Full Authority Digital Engine Control (FADEC). In accordance with the present disclosure, such advanced controlling systems may be provided with full authority to regulate engine operation by calculating systematic processes and adjusting progressive employment of the oxidation equipment to the engine and/or engine controls. Further, sensors may be utilized to measure and report flight and engine parameters to the control systems. Thus, system integration with overall engine operations and advanced aircraft systems may be provided. This may reduce the number of parameters that are managed by flight crews.

Software engineering processes can be used in the design, implementation, and testing of the systematic control processes. These processes may be used to control all phases of employment operations, and may also be responsible for protection against out-of-tolerance operations of the intended oxidation use. These processes may also provide redundancy and fail-safe procedures in the event of employment failures or malfunctions.

In some implementations, a swirl stabilizer (e.g., one or more swirlers) may be provided. The role of the swirl stabilizer is to generate turbulent flows within the combustor to better atomize the fuel for the combustion process. In implementations, a swirler may be part of the combustor that passes through the dome of a jet engine. The primary air flows through it as it enters in before the combustion zone. The duty of the swirler is to create turbulence in the airflow to readily mix the fuel within the air.

The swirl stabilizer generates turbulent flows within the combustor, which may create a low-pressure zone that produces circulation for an improved combustion course. It should be noted that in jet engines, higher turbulence flows may be created to decrease the velocity of air entering the swirler. However, the higher the turbulence flows, the higher the overall pressure loss within the combustion zone. Thus, example implementations provide a turbulent flow configured to improve pressure within the combustion zone.

In some implementations, turbulent flows may be reduced within the combustion zone while the oxidation system is employed. More sustainable combustion processes may be achieved by increasing the oxygen content within that flow. Thus, the turbulent flows may be decreased in order to improve the pressure within that zone. This same principle may be applied to the prior phase, the diffuser. Increasing its tolerable pressure flow may ultimately improve the overall pressure within the combustion zone. It should be noted that improved pressure may result in increased thermal inlet temperatures.

Figure 3:
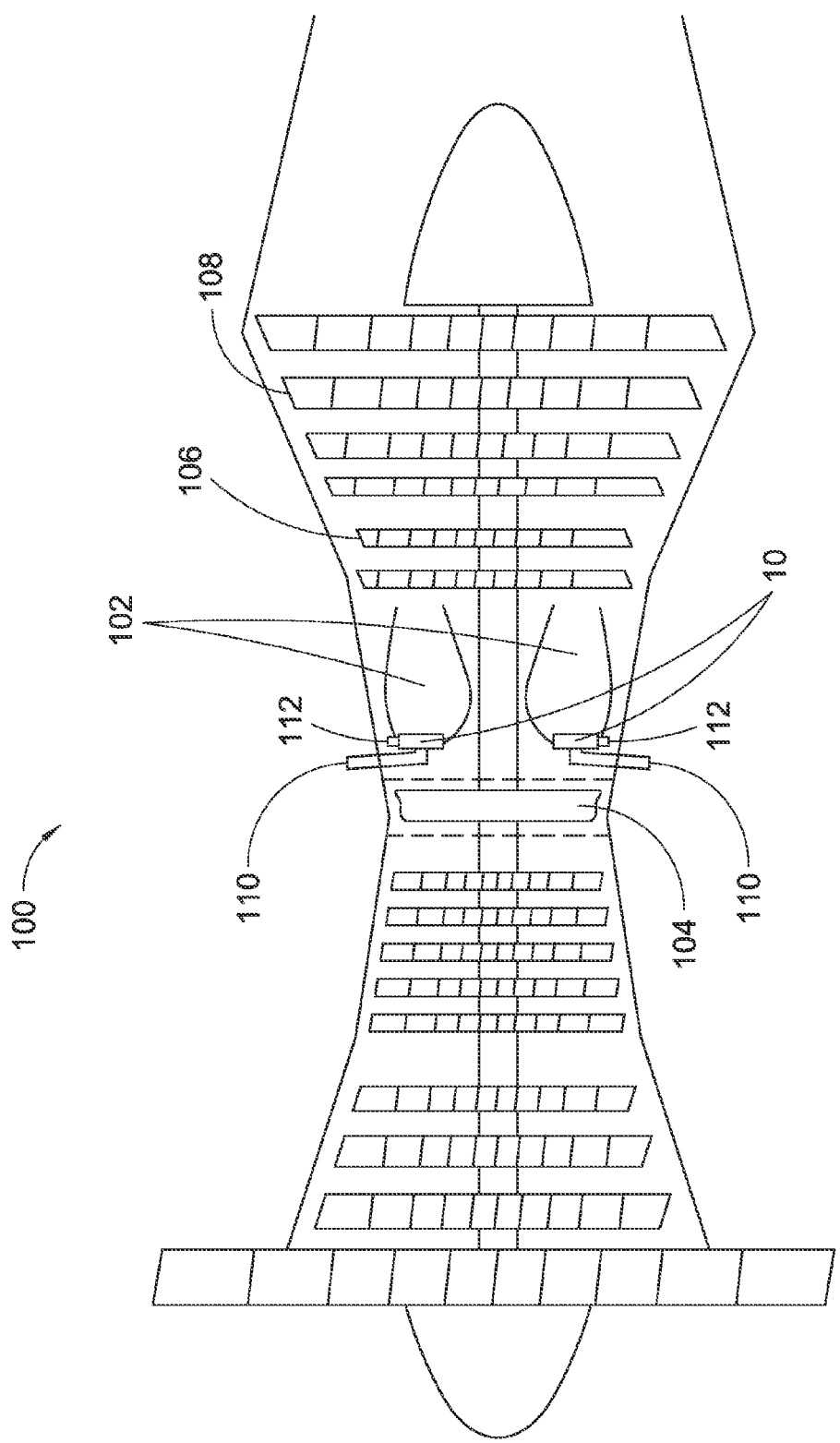
FIG. 3 is a cross-sectional side elevation view illustrating a jet engine in accordance with example implementations of the present disclosure.

Referring now to FIGS. 1 through 3, an example gas turbine engine 100 with improved fuel burn using enhanced oxidation with an onboard oxidizer is described. Arrangements are provided for injecting an oxidizer into a combustor section 102 of the engine 100. The injectors within a swirl stabilizer (e.g., swirler 10) spray the oxidizer into the air/fuel mixture with a swirling motion. This may augment the standard technique of compressing outside air through the compressor sections. Improved oxidation quality may result in a more complete combustion course and higher exhaust gas temperatures.

As shown in the accompanying figures, an engine 100 (e.g., a high bypass turbofan engine) includes a combustor 102, such as an annular combustor assembly, or the like. The engine 100 may also include a variable flow diffuser 104, which may change the velocity of incoming air (e.g., from a compressor into a swirler and combustor). The engine 100 also includes a high pressure turbine 106, which comprises a turbine stage configured to extract higher pressure gases and convert energy from the gases for use in the high pressure compressor. The engine 100 further includes a low pressure turbine 108, which comprises a turbine stage configured to extract lower pressure gases and convert energy from the gases for use in the main fan and low pressure compressor.

In implementations, the swirler 10 unit(s) is placed within the combustor 102 assembly. For example, the swirler 10 may be located forward within the combustor 102 flame tube (e.g., generally aft of the fuel injectors 110). The oxidation lines 112 extend into the engine 100 and are connected to the adapter feed and/or the insertion lines of the swirler 10 unit(s).

Within the system for injecting the oxidizer shown in FIGS. 1 and 2, admission for the oxidizer includes one or more pores 18a and/or one or more injectors 20. The pores 18a may be located on vane blades 12 proximal to the outer base of the swirler 16. The injectors 20 may be located on an inner surface 14a of the swirler housing.

In implementations, each group of injectors 20 and pores 18a may be positioned between each vane blade 12 within the swirler 10, and/or at various positions on or between the outer base 16, vane blades 12, or inner surface 14a of the swirler housing. The injectors 20 and pores 18a may be slanted to direct the oxidizer in a circular pattern defined by the swirler 10, so that when the injectors 20 and/or the pores 18a are engaged, the oxidizer flows in the same circular flow as the air before the combustion zone. In implementations, the pores 18a may be micro-pores. For the purposes of the present disclosure, the term "micro-pores" can be used to describe an arrangement of multiple, extremely small pores for admitting oxidizer. For example, the micro-pores may be between approximately five one-hundredths of a millimeter (0.05 mm) and one millimeter (1 mm) in diameter. An arrangement of one or more micro-pores may be located at various positions within the areas described above (e.g., on the surface of the vanes and/or at other injection points as described herein).

The injectors 20 and/or the pores 18a may be supplied with oxidizer through one or more insertion lines 22, which may be located in the rear of the swirler base 16a and/or the rear of the swirler housing 14b. The injectors 20 and/or the pores 18a may be supplied with oxidizer through an adaptor feed 24 located on the outer surface 14 of the swirler housing. Within the housing of the swirler 10 are connecting lines 26a, e.g., as shown in FIG. 2, that supply each vane blade 12 and/or injector 20 and/or pore 18a with oxidizer. Within the housing of the swirler 10 are connecting cords that are attached to rotatable vane guides that pivot a link fastened to each blade vane 12, pivoting the blade vanes 12.

In an example, the blade vanes 12 of the swirler 10 are oriented at an angle of approximately forty degrees (40°) (e.g., with respect to a plane oriented generally perpendicular to a longitudinal axis of the engine 100, where the longitudinal axis of the engine is generally defined in the direction of fluid flow through the engine 100). The blade vanes 12 of the swirler 10 can rotate up to approximately seven degrees (7°) (e.g., from one degree (1°) to six degrees (6°) from a standard vane position), decreasing the angle of slant, and enabling a higher-pressure flow into the combustor. For example, in some instances, the swirler vanes can rotate between approximately two degrees (2°) and approximately four degrees (4°). Additionally, the blade vanes may counter-rotate from a standard vane position, increasing the angle of slant, and enabling a lower-pressure flow into the combustor. However, it should be noted that one degree (1°) to six degrees (6°) of rotation for a swirler vane 12 is provided by way of example only, and is not meant to be restrictive of the present disclosure. Thus, in other configurations, the vanes 12 of the swirler 10 may rotate more or less than one degree (1°) to six degrees (6°). For example, the vanes of the swirler can rotate up to approximately twenty degrees (20°), more than twenty degrees (20°), and so forth. Further, in some implementations, the vane blades 12 may be fixed with respect to the swirler 10 and not configured to rotate with respect to the swirler.

Injection of the oxidizer may be governed by computer-controlled systems. In this manner, favorable results may be achieved during high altitude flight of an aircraft. This can be a result of the chosen oxidizer being injected at a decreased-rate in order to lengthen the oxidation time. Injecting the oxidizer at a decreased-rate can be advantageous when a gas turbine engine has a very low maximum continuous power at high altitude. In such an implementation, the engine may consume the oxidizer considerably less rapidly.

In some configurations, the engine 100 may include a variable flow diffuser 104. The variable flow diffuser 104 may increase air pressure more when injection of the oxidizer is engaged. When the oxidizer is engaged, higher pressure for combustion may be achievable. In other implementations, the engine 100 may not include the variable flow diffuser 104.

Referring to FIGS. 6 through 10, a variable-flow diffuser 104 can be described as a device that increases and/or decreases the velocity of incoming air leading to and/or around a combustion section. Varying the airflow into and/or around a combustor area may directly affect the pressure within and/or around a combustor.

A variable-flow diffuser 104 may regulate additional added pressure caused by engaging the oxidation system, which improves combustion within the combustor section.

When the oxidation system is engaged, a percentage of oxidizer (e.g., oxygen) that is injected within the combustion process may affect the exhaust gas temperature, improving the pressure to the turbines stages and consequently increasing power to the compressor stages. In this manner, pressure in the combustor section is increased. The use of the variable-flow diffuser 104 may be beneficial in regulating additional or excess pressure into the combustor.

In implementations, the variable-flow diffuser 104 allows for cooling around the combustor. This may be due to exhaust gas temperature increase when the oxidation system is engaged, increasing pressure to the turbine stages, and thereby increasing power to the compressors. An additional function of the variable-flow diffuser 104 can be to restrict airflow into its combustor by not allowing the combustion process to increase further due to excess air pressure caused as a result of the increase in power to the compressors. During this process, the outer part of the combustor can obtain additional cooling from the increase in power to the compressor sections. Additionally, combustion can be controlled in a regulated state during employment of the oxidation system.

Figure 6:
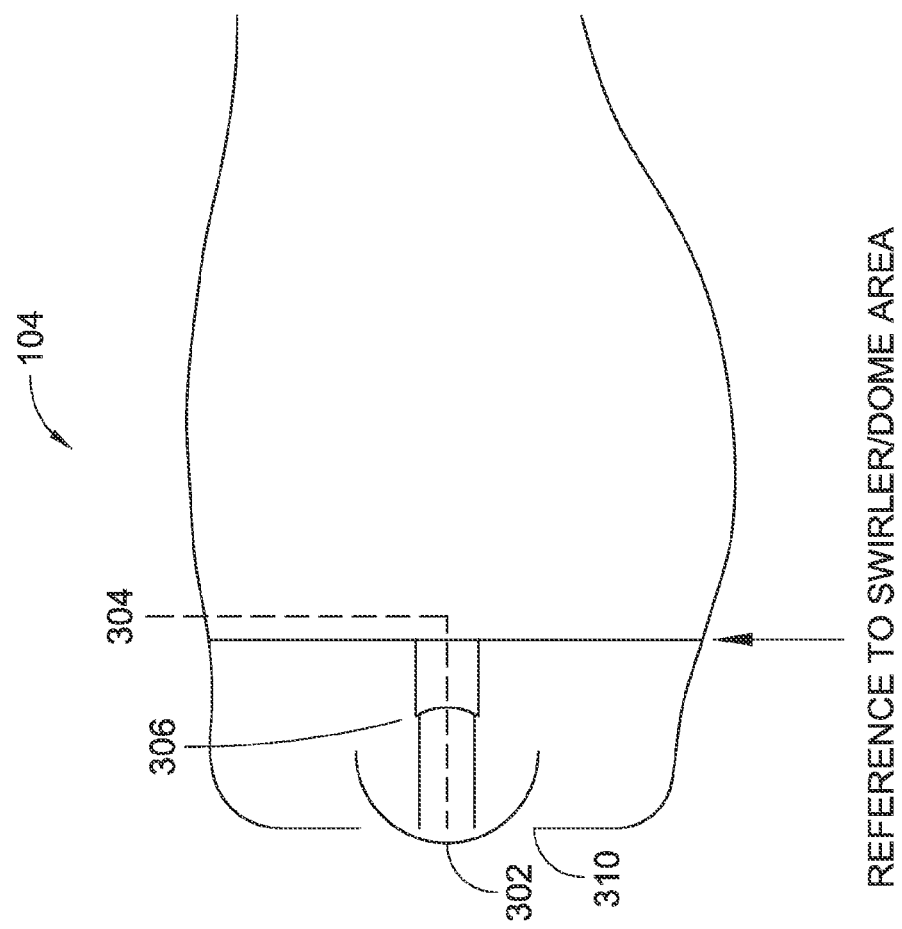
FIG. 6 is a cross-sectional side elevation view illustrating a variable flow diffuser for a gas turbine engine in accordance with example implementations of the present disclosure.
Figure 7:
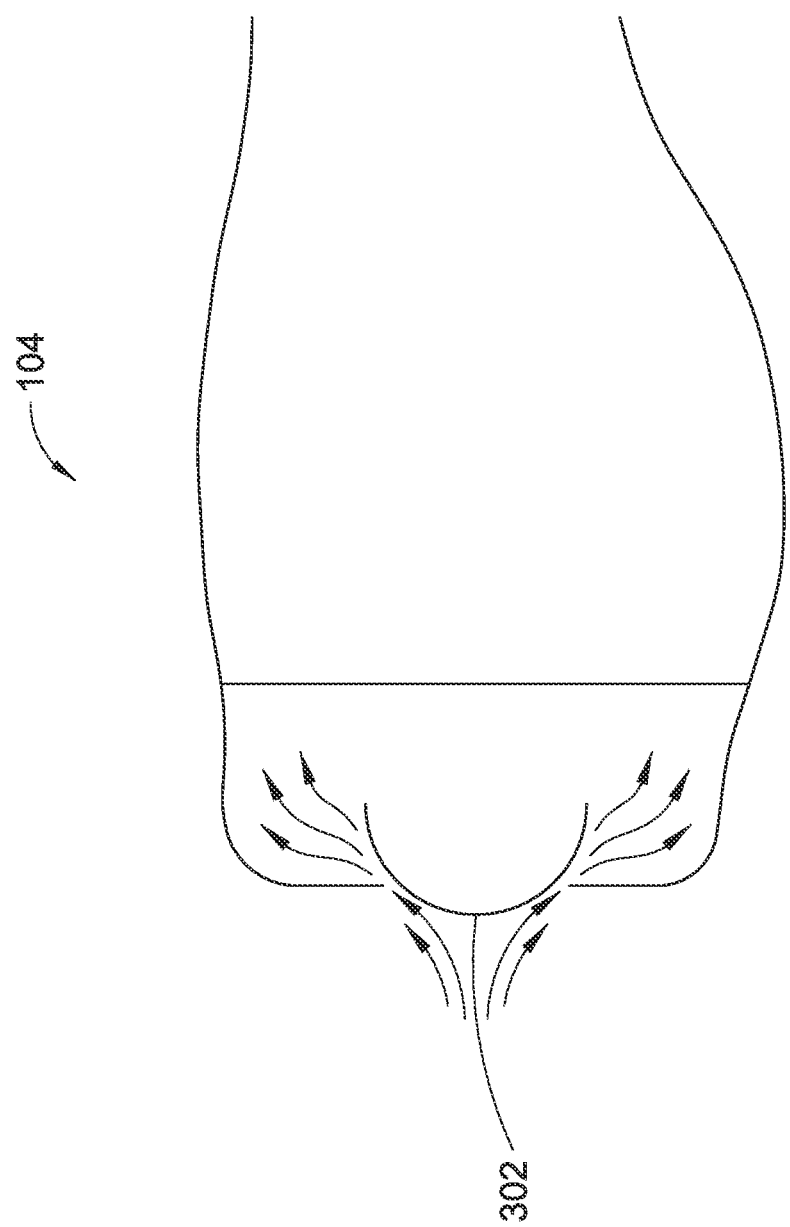
FIG. 7 is a cross-sectional side elevation view of the variable flow diffuser illustrated in FIG. 6, where the diffusing head is shown in a forwardly-extending orientation in accordance with example implementations of the present disclosure.
Figure 8:
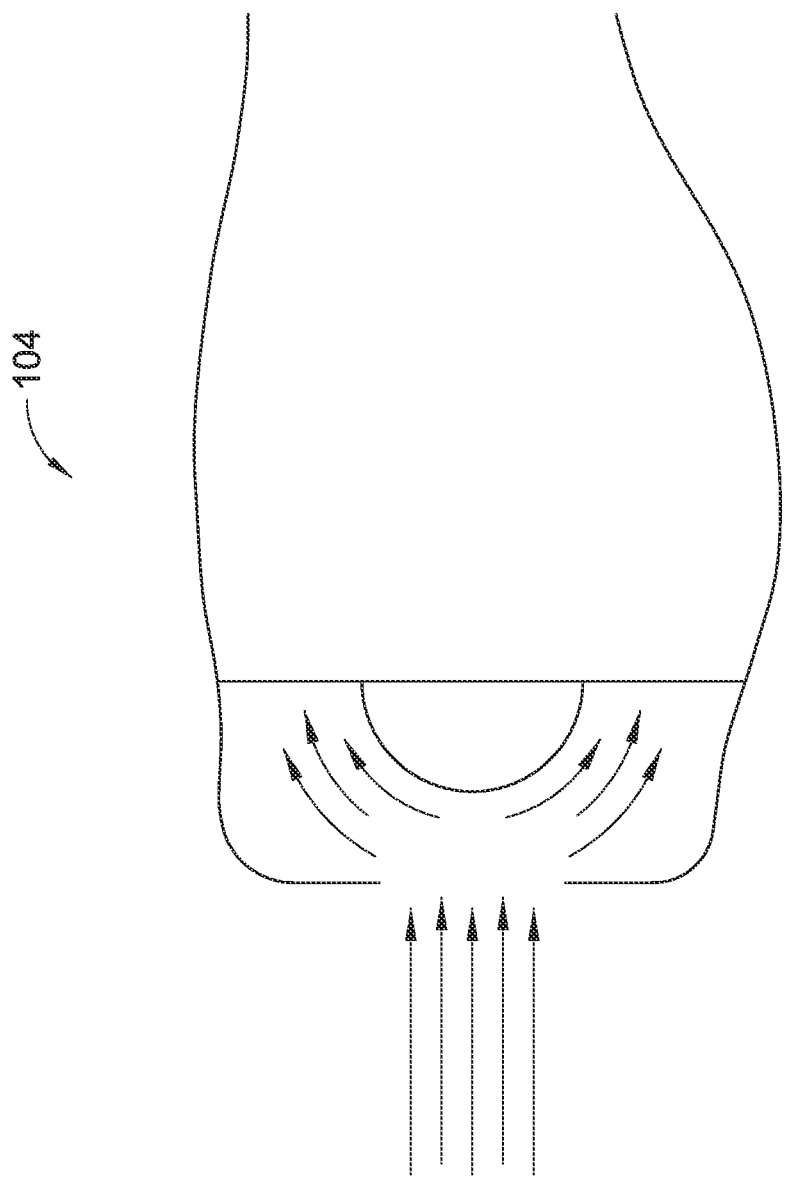
FIG. 8 is a cross-sectional side elevation view of the variable flow diffuser illustrated in FIG. 6, where the diffusing head is shown in a retracted orientation in accordance with example implementations of the present disclosure.
Figure 9:
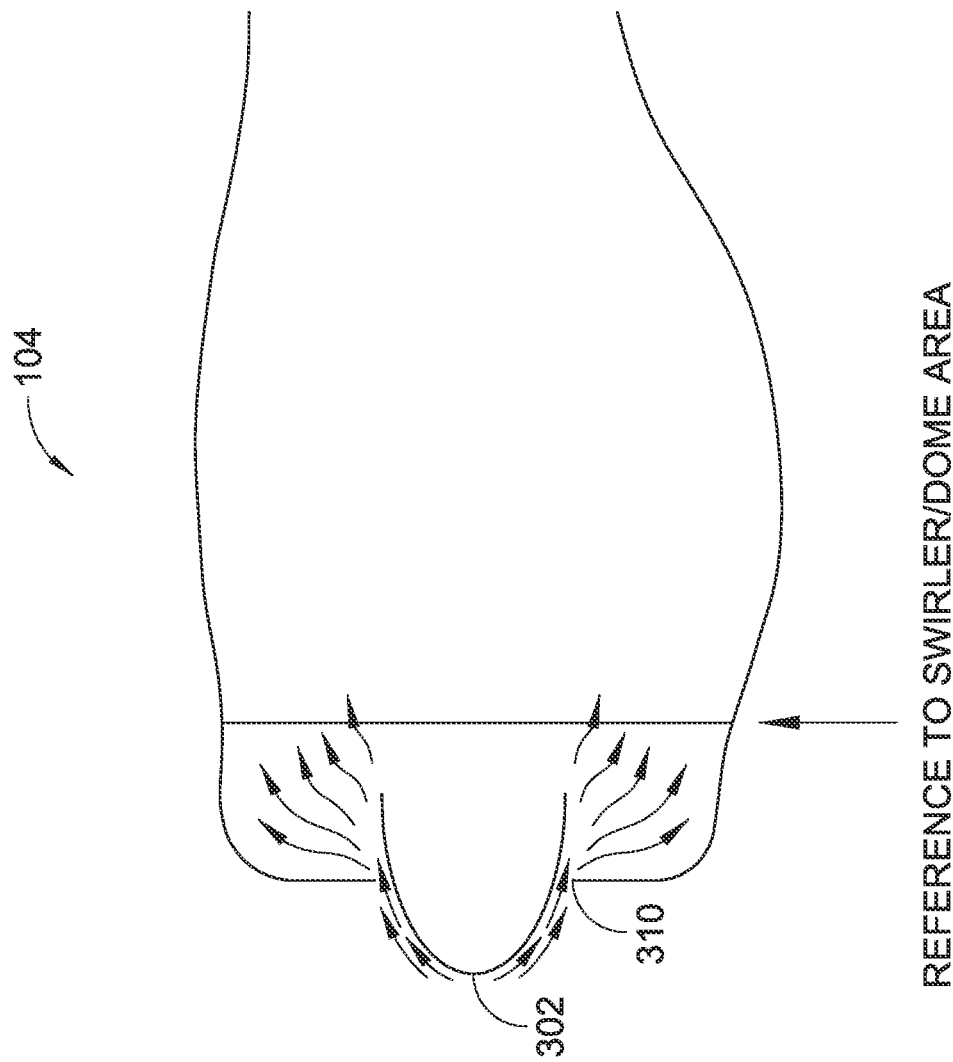
FIG. 9 is a cross-sectional side elevation view illustrating another variable flow diffuser for a gas turbine engine, where the diffusing head is shown in a forwardly-extending orientation in accordance with example implementations of the present disclosure.

The shape of a diffusing head 302 may range from spherical (e.g., as shown in FIG. 6) to oval (e.g., as shown in FIG. 9) to cone formed shapes, and so forth. The size and shape of a diffusing head 302 can be determined based upon a particular application. Large and broader shapes (e.g., as shown in FIGS. 7 and 8) may diffuse the airflow to a greater degree, while smaller and narrower shapes (e.g., as shown in FIG. 9) may diffuse the airflow to a lesser degree.

Shapes of the diffusing head 302 may also range in blended vane formation, or a blend of spherical/oval/cone/blended vane formations. A blended vane formation can be described as a merger of blade vanes blended around and/or within a diffusing head. In this manner, the air may be swirled during the process of diffusing.

The airflow leading into the variable-flow diffuser 104 passes through a core entrance 310. In some implementations, the core entrance 310 may be circular, while in other implementations, the core entrance 310 may not be circular.

In some instances, the diffusing head 302 and/or a guided shaft 306 assembly can be powered by pneumatics (e.g. air pressure) and/or a biasing force, such as a spring force.

In some instances, the diffusing head 302 and/or the guided shaft 306 assembly can be operated using hydraulic and/or pneumatic power.

In implementations, the fuel line/injector may be attached to the diffusing head 302 and an extension of the fuel line/injector can pass through the guided shaft 306 into the base of the swirler. In other implementations, the fuel line/injector may not be attached to the diffusing head 302.

In implementations, a separate-unit variable-flow diffuser may be used instead of the variable-flow diffuser 104 illustrated in FIGS. 6 through 10. A separate-unit variable-flow diffuser is not necessarily integrated within a combustor assembly, e.g., as opposed to the variable-flow diffuser 104. A separate-unit variable-flow diffuser may be located in the area between the combustor and compressor sections, and within the inner area of the compressor casing.

Figure 10:
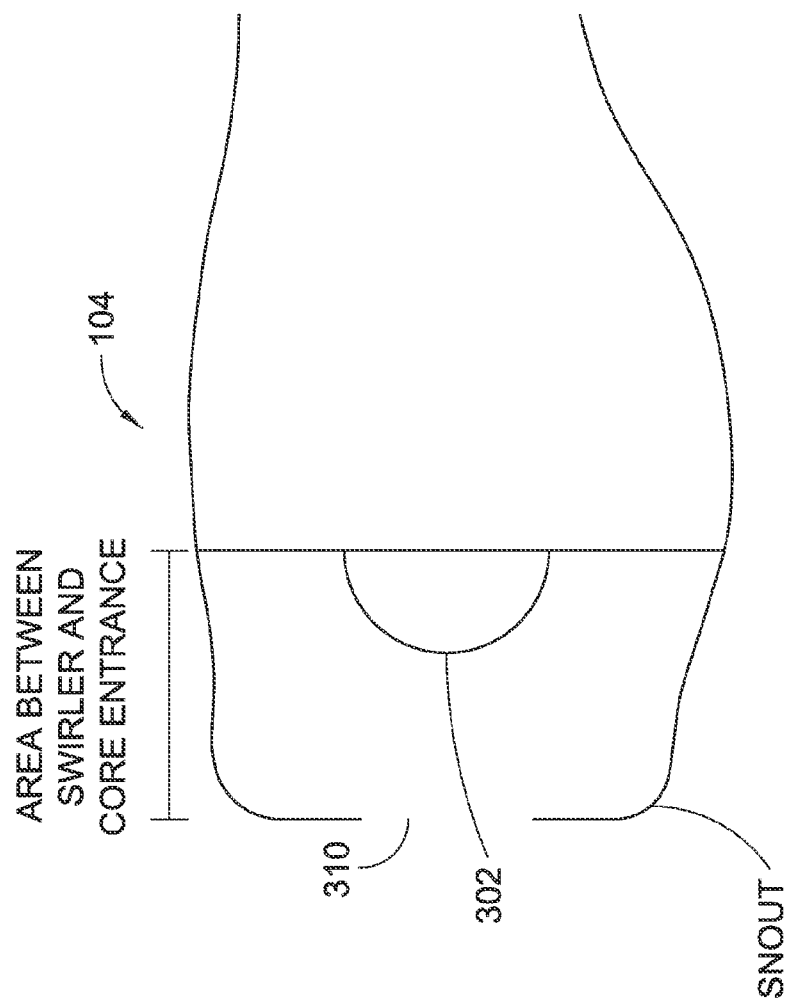
FIG. 10 is a cross-sectional side elevation view illustrating another variable flow diffuser for a gas turbine engine, where the diffusing head is shown in a retracted orientation in accordance with example implementations of the present disclosure.

With reference to FIG. 10, a variable-flow diffuser 104 with a longer snout and more space within the area between the swirler and core entrance 310 may provide more room for mechanical operation. Also, this configuration may increase the airflow when the diffusing head 302 is retracting and/or fully retracted.

With reference to FIG. 9, a variable-flow diffuser 104 with a shorter snout and less space within the area between the swirler and core entrance 310 may provide mechanical operation of the diffusing head 302 to extend or retract a lesser distance. This configuration may reduce the size and/or weight of the parts within the unit. This may also be beneficial to the mechanical reliability of the unit. This design may furnish a lesser overall weight of the variable-flow diffuser 104/combustor assembly.

With reference to FIG. 6, the diffusing head 302 can be operated on a guided shaft 306 aligned in front of the swirler unit. In implementations, the guided shaft 306 is spring-loaded and provides a force within the shaft and diffusing head 302. In implementations, a cord 304 may be attached within the diffusing head 302 and can pass through the guided shaft 306. In some implementations, the cord 304 may pass within the base of the swirler unit and through a vane within the swirler unit. The diffusing head 302 may retract to the base of the swirler (e.g., as shown in FIG. 8) and/or may extend outwards to the core entrance 310 (e.g., as shown in FIG. 7).

Another technique for introducing oxidizer into a combustor section is now described. Oxidizing injectors may be integrated into injecting fuel line(s) and/or fuel spray nozzles of an engine. This injection may be at a point where the fuel within the fuel lines/fuel spray nozzle is already in vaporized form. When the two gases, fuel and oxidizer, are introduced, the location where they mix may be referred to as the mixing point. The mixture is then sprayed into the combustor, ready for combustion. In this manner, mixing can be accomplished at an earlier stage.

Figure 11:
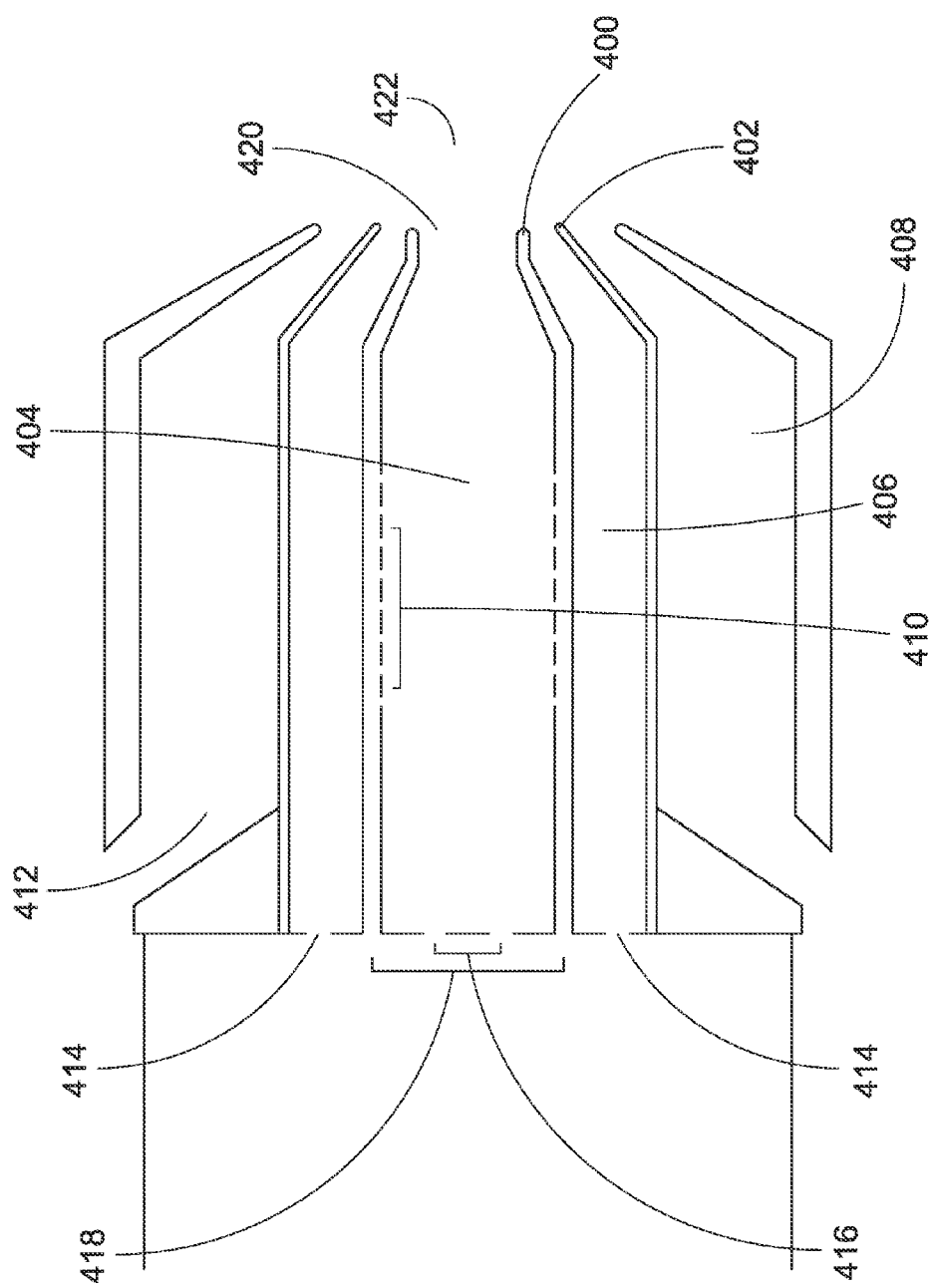
FIG. 11 is a side elevation view illustrating a fuel nozzle, where oxidizer is mixed with fuel in the fuel nozzle in accordance with example implementations of the present disclosure.

With reference to FIG. 11, the oxidizing injectors can be integrated into a duplex burner, which can also be referred to as a duplex fuel nozzle. A duplex burner may have two separate fuel feeds and/or separate coaxial nozzle exits, a primary nozzle 400 exit and a main nozzle 402 exit. Low pressure fuel passes through a low fuel pressure entry 416. High pressure fuel passes through a high fuel pressure entry 414. Fuel flow into the high and low fuel pressure entries 414, 416 may become vaporized. In this example, the oxygen is pressurized into the oxidizer entry 418. The oxygen then flows into the hollow lining of the primary nozzle 400. Micro-pores 410 are located within a hollow lining of the chamber, which makes up the primary nozzle 400. In this example the oxidizer and fuel are mixed within the chamber of the primary nozzle 400, ready to be injected into the combustor.

In implementations, oxidizer (e.g., oxygen) may be introduced into the area within the primary nozzle 404, the area within the main nozzle 406, the area over the orifice section 408, an airflow-over orifice section 412, the perimeter of nozzles 420, and/or the forward area of nozzles 422. In some implementations, micro-pores 410 may be used for introducing the oxidizer in the areas/sections described above.

It should be noted that the fuel nozzle shown in FIG. 11 is a diagrammatic representation of a duplex fuel nozzle provided for purposes of illustration and does not necessarily represent the mechanical functions of a duplex fuel nozzle. Rather, the example is used to illustrate techniques to integrate an oxidation system into a fuel system (e.g., fuel nozzle).

It should be noted that this disclosure encompasses the use of micro-swirler units and/or micro-screened pores (e.g., oxidizer injected through micro-pores) within the fuel spray nozzle. This may further improve the mixing process. It should also be noted that an integrated fuel spray nozzle system may or may not be used with other described techniques for introducing oxidizer into the combustion process, and/or may be used with various combinations thereof.

The combined volume of air that enters the combustor 102 is enriched with oxygen from the oxidizer. An additional advantage of the higher oxygen concentration may be that it lowers the ignition temperature of the fuel, and minimizes the risk of a flame blow out during normal engine operations at various altitudes while the system is in use. This can provide the aircraft's controlling systems the capability to execute engine restarts at higher altitudes.

The temperature of the delivered oxidizer into a releasing point (e.g., oxidizing injectors) may be relevant to the entry temperature from the total volume of air from the LP/HP compression stages. Delivering the oxygen at a proper temperature may augment the existing compression system that raises combustor entry temperature. In correlation to the Carnot cycle efficiency, delivering the oxidizer in a cooler state according to relative limitations can affect the efficiency of the engine. This may be most beneficial in high altitude cruise (e.g., because of low outside air temperature).

The most fuel inefficient stages of commercial aircraft routes are typically ground operations, preparation for takeoffs, takeoffs, climbs, descents, holding patterns, landing with the use of thrust reversers, induced drag, changing weather, and changing Air Traffic Control (ATC) instructions. All these stages of flight may lead to excessive consumption of jet fuel. Thus, other stages besides high altitude cruise may not be efficient.

The systems, methods, and apparatus disclosed herein may be used for the most inefficient stages of a jet aircraft's flight route, including extended flight operations other than high altitude cruise.

Strategies for engaging the enhanced oxidation system can vary according to different flight route applications. Many low-altitude configurations can be based upon a core strategy, as described below.

Advanced control systems within an aircraft can engage the oxidation system at the beginning of a takeoff. The oxidation system may continue to be in use until the aircraft reaches a designated altitude, in some cases above eighteen thousand feet (18,000 ft). The control systems may then disengage the oxidation system at the appropriate altitude. This may be because the air reaches a very low density within the atmosphere, and the engines may operate on a low fixed fuel flow input efficiently. In implementations, the control systems may reengage the oxidation system when the aircraft descends into denser air. At a pre-specified lower altitude, the oxidation system may be activated until landing or until the supply of stored oxygen permits. In some instances, the total supply of oxidation may provide approximately thirty (30) minutes of use, with approximately fifteen (15) minutes reserved for takeoff and climb, and approximately fifteen (15) minutes reserved for low altitude flight operations, descent, and landing. Thirty minutes of oxidation flight time is provided by way of example only, and is not meant to be restrictive of the present disclosure.

The enhanced oxidation system may especially serve certain categories of commercial flight routes well, such as flight routes that are ninety (90) minutes in duration or less. This can be because much of a short route is spent in climb, in mid-high altitude, in descent, or in preparation for landing. For example, with a flight route lasting sixty (60) minutes or less, at least half of the flight route may be in lower altitudes. This may generally translate to inefficient stages of flight.

The use of the enhanced oxidation system for shorter flight routes may be more beneficial to the overall fuel consumption of these routes. For example, if the aircraft requires less onboard fuel, the aircraft may have a lighter takeoff weight. Consequently, this can add to the efficiency of that flight route.

A midsized high-bypass turbofan engine from a widebody commercial airliner can ingest massive amounts of air. For example, approximately three hundred pounds (300 lbs) of air per-second may pass through the core compressors of such an aircraft. Roughly twenty percent (20%) of that air enters into the combustor. In an example, the present system may be used to enhance approximately five percent (5%) of the air that enters into the combustor; however, it is contemplated that high altitude usage may comprise enhancing approximately, but not necessarily limited to: one-quarter of a percent (0.25%) to five percent (5%). However, this range is provided by way of example only and is not meant to be restrictive of the present disclosure. Other implementations can enhance more or less of the air that enters the combustor. In some instances, approximately three pounds (3 lbs) of oxygen per-second may be added to the airflow within the combustor at takeoff. The employment of the system may then be progressively regulated by control systems as altitude increases.

In implementations, approximately thirty (30) minutes of usable oxidizer may be stored onboard. For example, the volume of stored oxygen can be estimated using a fundamental law. It should be noted that these stored volumes are only estimates, and using the ideal gas law only provides the weight of air per-gallon at mean sea level pressure and not the weight of pure oxygen per-gallon.

The ideal gas law is $pV=mRT$. Therefore, for the purposes of this discussion, the weight of one gallon of air is approximately one one-hundredth of a pound (0.01 lbs). Then, the weight of one gallon of air at twenty (20) times the pressure is eighteen one-hundredths of a pound (0.18 lbs). 16.7× 0.18=three pounds (3 lbs). For the purposes of the examples below, sixteen and seven-tenths gallons (16.7 gals) may equate to three pounds (3 lbs) at the pressure described.

For a high-bypass engine that ingests approximately three hundred pounds (300 lbs) of air per-second, approximately three pounds (3 lbs) of oxygen per second is injected and passes through the core of the combustor. Roughly sixteen and seven-tenths gallons (16.7 gals) per second of oxygen equates to approximately three pounds (3 lbs) per second. Therefore, in this example, sixty thousand gallons (60,000 gals) of pressurized oxygen can provide two mid-sized engines with approximately thirty (30) minutes of usable oxidation time in some implementations. This is considering the delivery of approximately three pounds (3 lbs) per second of oxygen is maintained at a constant rate. This may not necessarily be the case in practice. As altitude increases, the advanced control systems for the engines can progressively decrease the delivered oxidation content according to atmospheric conditions. Thus, the preceding example represents an estimation of the depletion rate of the stored oxidizer at a constant rate. This estimation can be used for employment strategies below twenty five thousand feet (25,000 ft), and not necessarily at high altitude conditions.

The total stored oxidizer, according to an engine that ingests three hundred pounds (300 lbs) of air per-second, may amount to approximately sixty thousand gallons (60,000 gals) of oxygen. The oxygen may be stored in carbon composite cylinders located within the aircraft. In implementations, the carbon composite cylinders, when filled to full capacity, may weigh less than one thousand five hundred pounds (1,500 lbs). This gives the present system the advantage of a low weight to high benefit factor.

In implementations, the enhanced oxidation system may be used in high altitude flight conditions. For example, the oxidation system may be employed in high altitude flight instead of or in addition to employing the oxidation system at lower altitudes. It should be noted that different techniques may be required for implementing a high altitude cruise strategy.

The high altitude stage of a flight is considerably more efficient compared to lower altitude flight. However, for longer flight routes because of the duration of these routes, more overall fuel is generally consumed for that stage of flight. Thus, more efficient fuel usage techniques can prove beneficial when applied to this stage within a route.

One advantage of engaging the oxidation system during high altitude cruise may be that the system can be employed during the lowest operating temperatures of the engine for high altitude flight conditions. The emissions of nitrogen oxides are primarily driven with higher exhaust inlet temperatures. Thus, lower levels of these unfavorable emissions are produced during low operating temperatures of an engine. For this reason, it may be useful to employ the oxidation system during this flight stage.

As an example, a turbofan engine may have a certified redline temperature of nine hundred five degrees Celsius (905° C.) at takeoff. The temperature of that exhaust may be reduced considerably as the aircraft climbs to higher altitudes. As the exhaust temperature continues to decrease, in some instances the oxidation system may be engaged when the Interturbine Temperature (ITT) decreases to below approximately eight hundred degrees Celsius (800° C.). However, eight hundred degrees Celsius (800° C.) is provided by way of example only and is not meant to be restrictive of the present disclosure. In this example, the oxidation system may be operated when the engine temperatures are between approximately four hundred fifty and eight hundred degrees Celsius (450° C.-800° C.). However, the oxidation system may be operated at above a temperature of approximately eight hundred degrees Celsius (800° C.) for specific flight conditions. In implementations for high altitude usage, for instance, the oxidation system is generally engaged when the aircraft climbs above eighteen thousand feet (18,000 ft).

Turbofan engines may typically lose over seventy-five percent (75%) of their maximum static thrust at an altitude of forty-five thousand feet (45,000 ft). One advantage to this thrust loss is that the total supply of oxidation can last approximately four (4) to five (5) times longer than when used for low-altitude flight. This may be due to the high thrust losses the engine encounters because of air density at high altitudes. Thus, using the oxidation system for high altitude flight may provide the benefit of using the oxidation system for considerably longer lengths of time, which may be suitable for most high altitude cruising routes other than for very short flight routes.

Strategies using the oxidation system for low altitude flight versus high altitude flight can be considerably different. Lower altitude flight techniques may provide an aircraft with more efficient use of the engines during maximum static thrust, and into climbs of altitudes below approximately eighteen thousand feet (18,000 ft). Further, the system may also be engaged at higher exhaust gas temperatures and higher throttle settings, improving the high-end thermal efficiency of the engine. However, the supply of oxidation may be used far more rapidly. Thus, this strategy may be more appropriate for flight routes shorter in length. Higher altitude flight techniques, e.g., generally above eighteen thousand feet (18,000 ft), may be more efficient for the engines due to the high thrust losses according to air density, and the very low temperatures of outside air. Consequently, this may lengthen the total usable supply of oxidation when less oxidizer is used per-second. Therefore, this strategy may be appropriate for longer duration flights. It should be noted that both low altitude and high altitude oxidation usage strategies may be used together in some configurations.

In implementations, control systems within the aircraft can engage the oxidation system above approximately eighteen thousand feet (18,000 ft). The oxidation system can engage at its designated altitude and continue to be employed throughout the course of high altitude cruise. The aircraft's controlling systems may then regulate the oxidation system until the aircraft reaches its elected altitude. The system may continue for the duration of cruise. For longer lasting flight routes, if there is a remaining supply of oxidation, the system can continue to be engaged during the descent of that flight course. In some configurations, the system may disengage below approximately eighteen thousand feet (18,000 ft). All operating parameters for employing the oxidation system can be managed by the automated/computer controls of the aircraft.

An aircraft may fly higher than its standard maximum usable altitude as long as there is a usable supply of oxidation within the aircraft. A flight route at the highest usable altitude is certainly advantageous in multiple regards. For instance, a primary benefit is that an aircraft may fly at an efficient true airspeed with a more favorable aerodynamic drag force.

With a high altitude cruise strategy, an aircraft may climb to even higher altitudes using the oxidation system, and the performance of climbs to these higher altitudes may be further improved. This may be a result of increasing the maximum continuous power of the engines by improving thermal efficiency with the oxidation system engaged. In some instances, this can constitute a specific application where the oxidation system may be operated at above a temperature of approximately eight hundred degrees Celsius (800° C.). In this manner, the maximum altitude can be achieved. Using this strategy, an aircraft may have a new higher absolute ceiling.

In implementations, the supply of oxidation to a gas turbine engine is pressurized oxygen. This oxygen may be separate from the normal respiratory supply oxygen for onboard passengers. The placement of the oxidizers may be subject to specific aircraft boarding area restrictions. For example, the placement of those oxidizers can be selected according to specific regulations.

Carbon composite containers can be used for the storage of the oxidation supply. For example, carbon composite cylinders may be lighter and may be capable of holding a higher pressure rating than aluminum tanks. In some implementations, the total supply of cylinders necessary for thirty (30) minutes of use in lower altitudes may weigh less than approximately one thousand five hundred pounds (1,500 lbs). Thus, such containers can be stored in multiple areas onboard an aircraft. For instance, the additional weight may not necessarily be required to be located near the Center of Gravity (CG) of the aircraft.

In general, aviation fuel tanks are located at or near the point of the aircraft's CG (e.g., so that the aircraft can remain balanced as fuel is depleted). In some implementations, the oxidizers can be placed far from the fuel tanks. This is facilitated due to the relatively light weight of the containers holding the oxidizer with respect to the weight of the aircraft's fuel. In addition to being isolated from the fuel tanks, the oxidation containers may be stored on separate levels from where the fuel is located. Isolating the oxidizers from the fuel tanks can result in a decreased risk factor, in the event of fuel leaking or fuel fires.

It should be noted that while pressurized oxygen is specifically described for the oxidizer, various oxidizers may be used in accordance with the present disclosure, including, but not necessarily limited to: hydrogen peroxide, nitrous oxide, nitrogen tetroxide, mixed oxides of nitrogen (MON), and so forth. For example, gasifying onboard liquid oxygen as an oxidizer may be used for various aircraft including, but not necessarily limited to military aircraft. For instance, liquid oxygen oxidizer may be well suited for crew boarded aircraft or unmanned aircraft. One advantage is that a high volume of oxidizer can be stored in minimal boarding space.

In some instances, liquid oxygen (LOX) oxidizer may be a suitable choice for long-range flights due to a larger amount of oxidizer/high-concentration of oxidizer being stored in a relatively small amount of space. Accordingly this oxidizer may be an appropriate configuration for, but not necessarily limited to: transcontinental and intercontinental aircraft flights. In this mode, an aircraft may be able to carry a greater payload of oxidizer in a minimal boarding area. This may provide an aircraft with a greater usable oxidation flight time in accordance with the present disclosure. Further, LOX oxidizer may be used for various military operations (e.g., unmanned aircraft). However, military aircraft are provided by way of example only and are not meant to be restrictive of the present disclosure. Thus, in other implementations, LOX can be used with aircraft in other applications.

Figure 5:
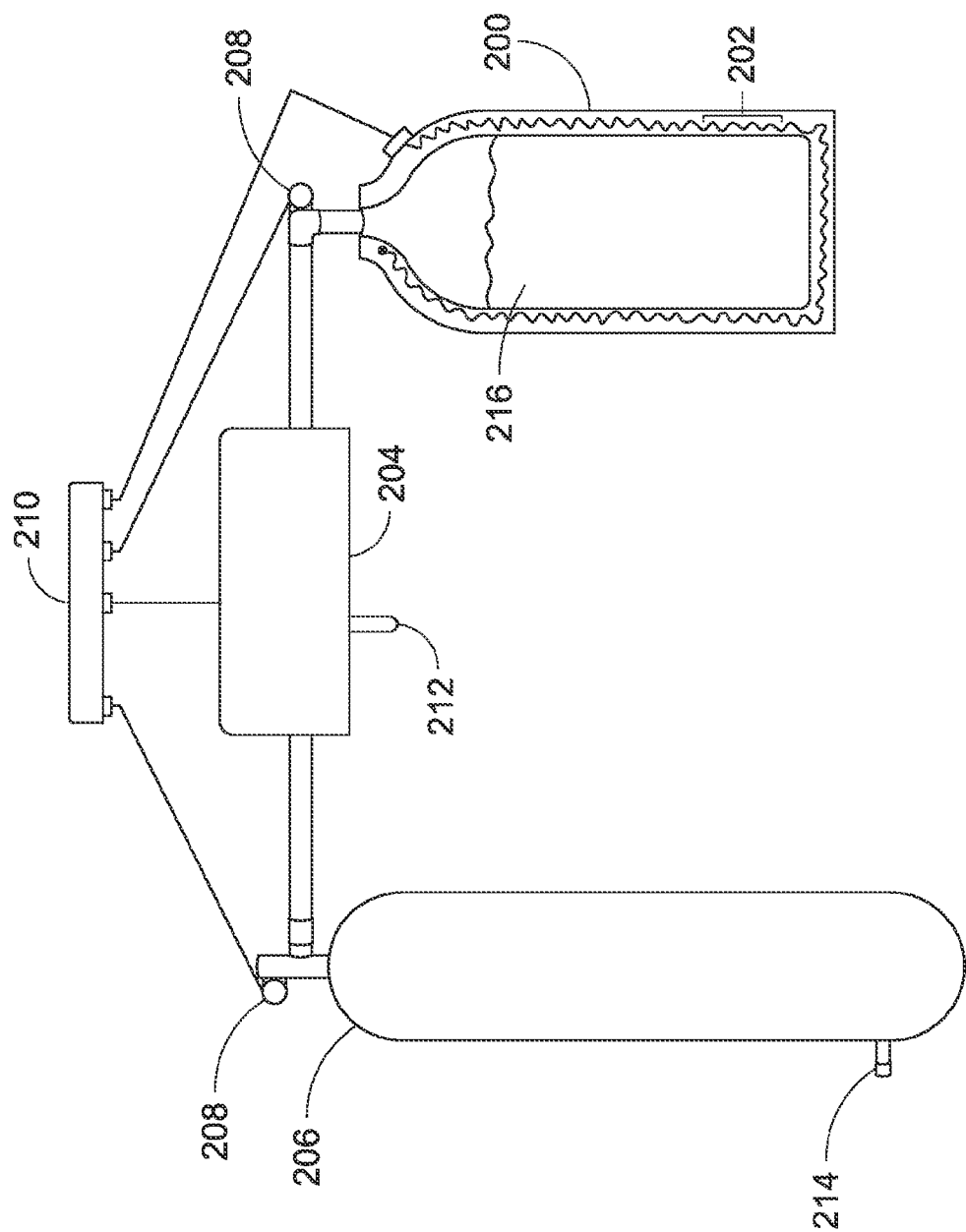
FIG. 5 is a partial cross-sectional side elevation view illustrating a heat exchanger for gasifying liquid oxygen stored in an oxygen storage cylinder in accordance with example implementations of the present disclosure.

Liquid oxygen may be converted into a gas form, in order to be pressurized into one or more oxygen storage cylinders for use in the disclosed oxidation system. In this example, a gasification and transfer process is described with reference to FIG. 5. A heat exchanger 202, which is controlled by a computer unit 210, can be used to gasify liquid oxygen at various rates of gasification. For example, the heat exchanger 202 can heat one or more liquid oxygen storage tanks 200, which can be implemented using, for example, carbon composite cylinders to store gasified oxidizer (e.g., oxygen). The level of heating of the liquid oxygen storage tanks 200 may be dependent upon a volume of oxygen that is required to fill or replenish oxidation within oxygen storage cylinders 206. As liquid oxygen 216 gasifies upwards (e.g., to the top of its container), it enters a pressurization regulator 204. In implementations, a function of the pressurization regulator 204 is to control the incoming gasified oxygen, and pressurize it into the oxygen storage cylinders 206. Another function of the pressurization regulator 204 may be to discharge excess gas (e.g., via discharge cylinder 212) when the capacity of the oxygen storage cylinders 206 is full.

The computer unit 210 can regulate the heat exchanger 202, the pressurization regulator 204, and/or measure pressure levels (e.g., using a gauge 208) within the oxygen storage cylinders 206 to regulate accordingly. The computer unit 210 can also measure the supply of liquid oxygen 216 and the rate at which it is gasified. This may be determined using the pressurization regulator 204. In implementations, the oxygen storage cylinders 206 can be used as the supply that provides (e.g., via exit cylinder 214) for the disclosed oxidation system to an aircraft engine, such as the engine 100. The computer unit 210 may be communicatively coupled with and/or governed by an aircraft's computer controlling systems.

The liquid oxygen storage tanks 200 may be insulated. The level of insulation can be dependent upon a desired rate of gasification of the oxidizer, e.g., in implementations where the oxidizer comprises liquid oxygen. The level of insulation can also be dependent upon the application of the aircraft and flight route, (e.g., when the storage tanks use more insulation, the weight of the tanks may be greater and can affect the overall weight of an aircraft).

In implementations, an engine, including some or all of its components, operates under computer control. For example, a processor can be included with or in an aircraft to control the components and functions of engines described herein using software, firmware, hardware (e.g., fixed logic circuitry), manual processing, or a combination thereof. The terms "controller" "functionality," "service," and "logic" as used herein generally represent software, firmware, hardware, or a combination of software, firmware, or hardware in conjunction with controlling the engines. In the case of a software implementation, the module, functionality, or logic represents program code that performs specified tasks when executed on a processor (e.g., CPU or CPUs). The program code may be stored in one or more computer-readable memory devices (e.g., memory and/or one or more tangible media), and so on. The structures, functions, approaches, and techniques described herein can be implemented on a variety of commercial computing platforms having a variety of processors.

For example, an engine may be coupled with a controller for controlling the injection of oxidizer, the gasification of oxidizer, and so forth. The controller may include a processing module, a communications module, and a memory module. The processing module provides processing functionality for the controller and may include any number of processors, micro-controllers, or other processing systems and resident or external memory for storing data and other information accessed or generated by the controller. The processing module may execute one or more software programs, which implement techniques described herein. The processing module is not limited by the materials from which it is formed or the processing mechanisms employed therein, and as such, may be implemented via semiconductor (s) and/or transistors (e.g., using electronic integrated circuit (IC) components), and so forth. The communications module is operatively configured to communicate with components of the engine. The communications module is also communicatively coupled with the processing module (e.g., for communicating inputs from the engine to the processing module). The communications module and/or the processing module can also be configured to communicate with a variety of different networks including, but not necessarily limited to: the Internet, a cellular telephone network, a local area network (LAN), a wide area network (WAN), a wireless network, a public telephone network, an intranet, and so on.

The memory module is an example of tangible computer-readable media that provides storage functionality to store various data associated with operation of the controller, such as software programs and/or code segments, or other data to instruct the processing module and possibly other components of the controller to perform the steps described herein. Thus, the memory can store data, such as a program of instructions for operating an engine (including its components), data, and so on. Although a single memory module is described, a wide variety of types and combinations of memory (e.g., tangible memory, non-transitory) may be employed. The memory module may be integral with the processing module, may comprise stand-alone memory, or may be a combination of both.

The memory module may include, but is not necessarily limited to: removable and non-removable memory components, such as Random Access Memory (RAM), Read-Only Memory (ROM), Flash memory (e.g., a Secure Digital (SD) memory card, a mini-SD memory card, and/or a micro-SD memory card), magnetic memory, optical memory, Universal Serial Bus (USB) memory devices, hard disk memory, external memory, and other types of computer-readable storage media. In implementations, the memory module may include removable Integrated Circuit Card (ICC) memory, such as memory provided by a Subscriber Identity Module (SIM) card, a Universal Subscriber Identity Module (USIM) card, a Universal Integrated Circuit Card (UICC), and so on.

CONCLUSION

As used herein, the term "approximately" shall mean approximately and/or exactly with respect to the value or range of values specified. Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A gas turbine engine comprising:
   a compressor for compressing air from an environment;
   a combustor for receiving the compressed air from the compressor, mixing the compressed air with fuel, and combusting the fuel;
   a turbine coupled with the compressor for receiving exhaust gas from the combustion and powering the compressor;
   an injector coupled with a source of oxidizer for injecting an oxidizer into the combustor; and
   a swirler having the injector for spraying the oxidizer into the combustor, wherein the oxidizer is mixed with the fuel in at least one of a fuel line or a fuel spray nozzle for supplying the fuel to the combustor.

2. The gas turbine engine as recited in claim 1, wherein the source of oxidizer comprises at least one of oxygen, pressurized oxygen, liquid oxygen, or gasified liquid oxygen.

3. The gas turbine engine as recited in claim 1, wherein the source of oxidizer is coupled with a heat exchanger, and the heat exchanger is coupled with a controller for controlling a gasification rate of the oxidizer.

4. The gas turbine engine as recited in claim 1, wherein the swirler is positioned within a core entrance of a flame tube of the combustor.

5. The gas turbine engine as recited in claim 1, further comprising at least one of a cooling hole, a dilution hole, a pore, or a micro-pore for injecting the oxidizer into a flame tube of the combustor.

6. The gas turbine engine as recited in claim 1, further comprising a variable flow diffuser for adjusting the pressure in the combustor.

7. A gas turbine engine comprising:
   a compressor for compressing air from an environment;
   a combustor for receiving the compressed air from the compressor, mixing the compressed air with fuel, and combusting the fuel;
   a turbine coupled with the compressor for receiving exhaust gas from the combustion and powering the compressor;
   an injector coupled with a source of oxidizer for injecting the oxidizer into the combustor, the injector positioned within a core entrance of the combustor for spraying the oxidizer into the combustor, wherein the oxidizer is mixed with the fuel in at least one of a fuel line or a fuel spray nozzle for supplying the fuel to the combustor.

8. The gas turbine engine as recited in claim 7, further comprising a variable flow diffuser for adjusting the pressure in the combustor.

9. The gas turbine engine as recited in claim 1, further comprising a fuel injector for injecting the fuel into the combustor, wherein the fuel injector and the injector are positioned within a flame tube of the combustor.

10. The gas turbine engine as recited in claim 1, wherein the oxidizer is injected within a flame tube of the combustor.

11. The gas turbine engine as recited in claim 7, wherein a variable flow diffuser is automatically controlled for adjusting the pressure in the combustor.

12. The gas turbine engine as recited in claim 7, wherein the injection of the oxidizer into the combustor is automatically controlled.

13. The gas turbine engine as recited in claim 7, wherein the oxidizer is supplied from a source of oxidizer coupled with a heat exchanger, and the heat exchanger is coupled with a controller for controlling a gasification rate of the oxidizer.

14. The gas turbine engine as recited in claim 7, wherein the injector is positioned between the core entrance of the combustor and a primary combustion zone within the combustor.

15. The gas turbine engine as recited in claim 7, wherein the source of oxidizer comprises at least one of oxygen, pressurized oxygen, liquid oxygen, or gasified liquid oxygen.

16. The gas turbine engine as recited in claim 7, wherein the oxidizer is injected within a flame tube of the combustor.

17. The gas turbine engine as recited in claim 7, further comprising at least one of a cooling hole, a dilution hole, a pore, or a micro-pore for injecting the oxidizer into a flame tube of the combustor.

18. A gas turbine engine comprising:
   a compressor for compressing air from an environment;
   a combustor for receiving the compressed air from the compressor, mixing the compressed air with fuel, and combusting the fuel;
   a turbine coupled with the compressor for receiving exhaust gas from the combustion and powering the compressor;
   an injector coupled with a source of oxidizer for injecting an oxidizer into the combustor; and
   a swirler having the injector for spraying the oxidizer into the combustor, wherein the swirler is positioned within a core entrance of a flame tube of the combustor.

* * * * *